United States Patent [19]
Sugawara et al.

[11] 3,809,933
[45] May 7, 1974

[54] SUPERCOOLED ROTOR COIL TYPE ELECTRIC MACHINE

[75] Inventors: Hiroyuki Sugawara; Kooji Kuwabara, both of Hitachi, Japan

[73] Assignee: Hitachi Ltd., Chryoda-ku, Japan

[22] Filed: Aug. 25, 1972

[21] Appl. No.: 283,649

[30] Foreign Application Priority Data
Aug. 27, 1971  Japan............................46–65110

[52] U.S. Cl.................. 310/52, 310/10, 310/40
[51] Int. Cl. .............................................. H02k 9/00
[58] Field of Search ............... 310/52, 64, 40, 10

[56] References Cited
UNITED STATES PATENTS

| 3,679,920 | 7/1972 | MacNab | 310/52 |
|---|---|---|---|
| 3,657,580 | 4/1972 | Doyle | 310/52 |
| 3,644,766 | 2/1972 | Hughes | 310/40 |
| 3,648,082 | 3/1972 | MacNab | 310/10 |
| 3,242,418 | 3/1966 | Mela | 310/52 |
| 3,665,229 | 5/1972 | Lorch | 310/52 |
| 3,708,705 | 1/1973 | Tinlin | 310/52 |

*Primary Examiner*—R. Skudy
*Attorney, Agent, or Firm*—Craig and Antonelli

[57] ABSTRACT

An electric rotary machine having an armature coil at ambient temperature disposed on the stator and a supercooled field coil disposed on the rotor and enclosed in a container which is integral with said rotor, a major part of the outer surface of said container being coated with a thermal insulation layer, the supercooling liquid being introduced into the container through a tube inserted into the rotor along the rotational axis of the rotor, and the evaporated gas of the supercooling medium being discharged through a labyrinthine path or a series of partitioned compartments provided at each axial end of the container to establishing a uniform temperature gradient along the shaft of the rotor between the inside of the supercooled rotor and the axial ends thereof which are at ambient temperature.

19 Claims, 6 Drawing Figures

SUPERCOOLED ROTOR COIL TYPE ELECTRIC MACHINE

BACKGROUND OF THE INVENTION

1. Field of the Invention

This invention relates to supercooled rotor coil type electric machines having a rotor coil of a superconductive wire maintained in the superconductive state or a conducting wire held at a supercool temperature.

2. Description of the Prior Art

Usually, the electric resistance of a metal is reduced when its temperature is reduced. By way of example, if copper (Cu) or aluminum (Al) is cooled down to the temperature of liquid hydrogen, its electric resistance is reduced to about 0.1 percent of the value at normal temperature. Also, when such superconductive materials as niobium (Nb), niobium-zirconium alloy (Nb-Zr) and stannic niobide ($Nb_3Sn$) are cooled down to the temperature of liquid helium, they are rendered into the so-called superconductive state, that is, their electric resistance becomes zero. There have heretofore been proposed supercooled rotor coil type electric machines having a rotor coil of the above superconductive wire held in the superconductive state or conducting wire held at a supercool temperature. In this type of electric machine, the supercooling liquid for cooling the superconductive wire coil or conducting wire coil at a supercool temperature is introduced into the inside of the rotor.

Therefore, similar to the usual supercooled apparatus in the supercooled rotor coil type electric machine there is a problem of evaporation of the supercooling liquid due to thermal conduction from normal temperature zone to the supercool temperature zone. In these apparatus, the efficiency of cooling down to a supercool temperature such as the liquid helium temperature is very low. For example, if usual cooling means is used, to make up for a thermal leak of the temperature of liquid helium for 1 watt it is necessary to operate a cooling apparatus with a rating of 300 watts to 1 kilowatt. Particularly, in the supercooled rotor coil type electric machine the thermal leak through the rotor shaft is extremely large. Since the rotor shaft serves to take out the force exerted to the rotor coil to the outside or transmit external force to the rotor body for rotating the same, it must have enough mechanical strength to withstand the torque exerted to it. Therefore, its diameter cannot be excessively reduced for the purpose of eliminating or reducing the thermal leak.

Usually, in order to reduce the thermal leak through the rotor shaft to the supercooling liquid, the length of the rotor shaft is increased, or a gas or liquid at an intermediate temperature between normal temperature and the temperature of the supercooling liquid (for instance, liquid nitrogen in the case if liquid helium is used as supercooling liquid) is provided in contact with the rotor shaft. These measures, however, lead to increased size and complicated construction of the rotor shaft of the apparatus such as supercooled rotor coil type electric machines.

Further, in the supercooled rotor coil type electric machine, unlike the stationary supercooled equipment, it is necessary to introduce the supercooling liquid into the inside of the rotating rotor. Where liquid helium or liquid hydrogen is used as the supercooling liquid, air would be solidified if it is introduced through the frictional seal between the rotor side and stator side. Therefore, leakage of the supercooling liquid or supercooling medium evaporation gas through the frictional seal between rotor and stator sides should be completely prevented. However, the resilient packings used for the frictional seal lose their resiliency at the supercool temperature. For this reason, it is extremely difficult to introduce the supercooling liquid into the inside of the rotor container by providing frictional seals at the supercool temperature zone.

SUMMARY OF THE INVENTION

It is a general object of the invention to provide a supercooled rotor coil type electric machine, with which it is possible to widely reduce evaporation of the supercooling liquid introduced into the inside of the rotor.

Another object of the invention is to provide a supercooled rotor coil type electric machine, with which the thermal leak through the rotor shaft to the inside of the rotor may be reduced.

A further object of the invention is to provide a supercooled rotor coil type electric machine having a reduced rotor shaft length.

A still further object of the invention is to provide a supercooled rotor coil type electric machine having a simplified rotor shaft construction.

A yet another object of the invention is to provide a supercooled rotor coil type electric machine capable of efficiently introducing the supercooling liquid into the interior of the rotor.

A yet another object of the invention is to provide a supercooled rotor coil type electric machine provided with means to reduce evaporation of the supercooling liquid introduced into the rotor interior due to the flow of the supercooling liquid relative to the rotor.

A yet another object of the invention is to prevent leakage of the supercooling liquid or supercooling medium evaporation gas.

A yet further object of the invention is to provide a supercooled rotor coil type electric machine provided with means to reduce evaporation of the supercooling liquid due to eddy current generated in the rotor coil.

The invention features a temperature gradient forming means for establishing a substantially uniform temperature gradient over the rotor shaft from a supercooling temperature on the rotor interior side toward the axially outer shaft end down to normal temperature. With this means, the thermal leak through the rotor shaft to the rotor interior may be reduced to reduce evaporation of the supercooling liquid, as well as providing for reduced rotor shaft length and simplified rotor shaft construction. Another feature of the invention resides in a supercooling liquid supply means centrally extending through the rotor shaft for effectively introducing the supercooling liquid into the interior of the rotor. The supercooled rotor coil type electric machine according to the invention further features baffle means disposed within the interior of the rotor for preventing the flow of the supercooling liquid thereinto relative thereto, and shield means to prevent external field variations from having the adverse effects of causing the generation of eddy currents in the rotor coil, thus eventually reducing the evaporation of the supercooling liquid within the rotor interior.

The above and other objects, features and advantages of the invention will become more apparent from the description of the preferred embodiments hereinunder when read in connection with the accompanying drawings.

DESCRIPTION OF THE PREFERRED EMBODIMENTS

Figure 1:
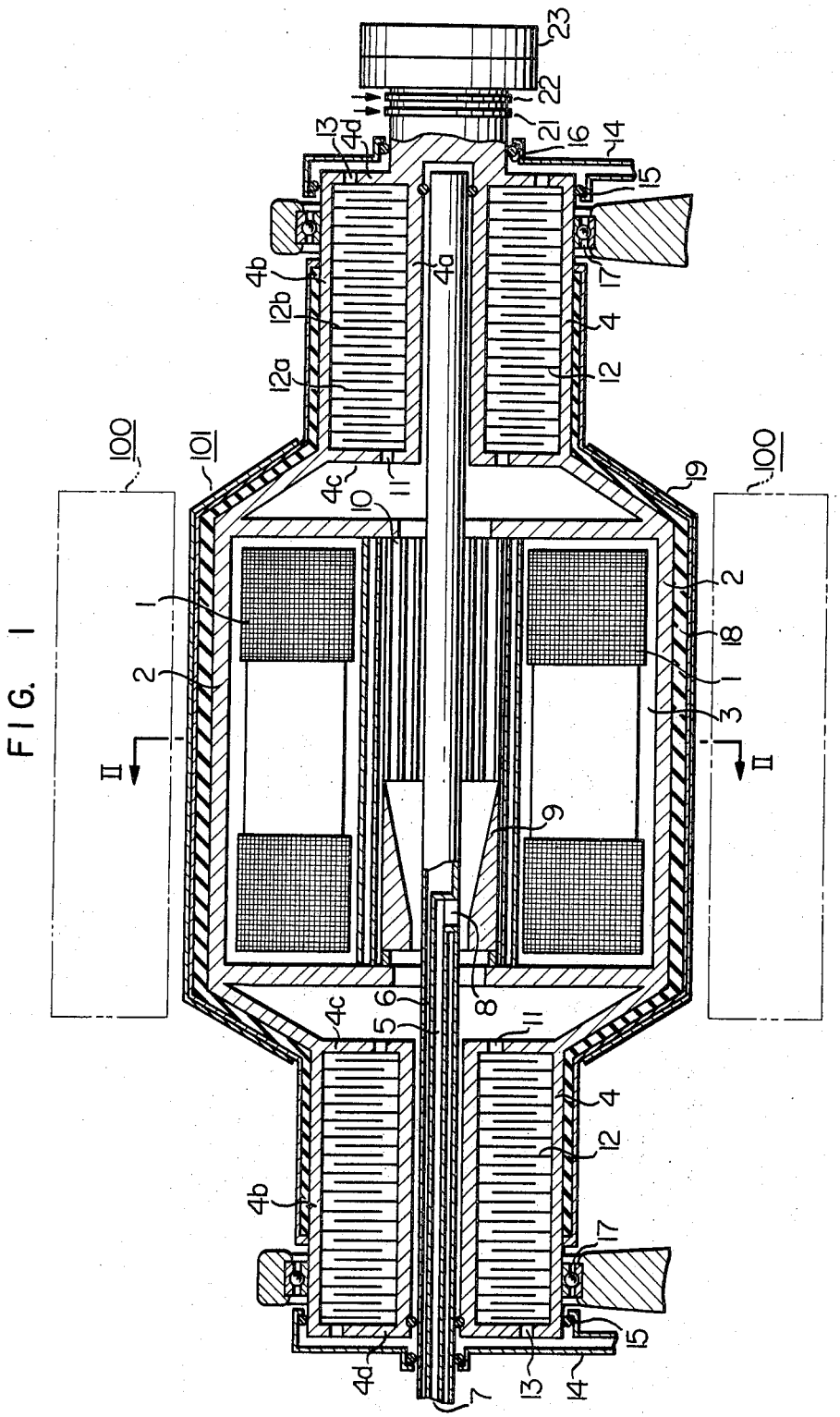
FIG. 1 is an axial sectional view of an embodiment of the supercooled rotor coil type electric machine according to the invention.

Referring now to FIG. 1, which is a longitudinal sectional view showing an embodiment of a rotating-field type electric machine having a supercooled rotor coil according to the invention, reference numeral 101 designates a rotor, which is inserted in a stator 100 provided with a stator coil in the same way as in the usual electric machine. The detailed construction of the stator 100 is not shown. The rotor 101 has a field coil 1, which is wound into a predetermined form and arranged along the inner periphery of a rotor container 2. The field coil 1 may be formed by winding a superconductive wire of a superconductive material rendered superconductive at temperatures below the critical temperature, such as niobium (Nb), niobium-zirconium alloy (Nb-Zr) and stannic niobide (Nb$_3$Sn), or a wire of a good conductor such as copper and aluminium. The coil 1 is held immersed in a supercooling liquid 3 introduced into the rotor container 2. Since the supercooling liquid 3 introduced into the rotor container 2 is flung against the inner wall of the container due to the centrifugal force produced by the high-speed rotation of the rotor, the field coil 1 can always be held immersed in the supercooling liquid 3.

The rotor container 2 is supported by integral hollow cylinders 4 serving as a rotor shaft and axially extending from opposite ends. Extending through one of the hollow cylinders 4 and slightly spaced from the inner wall thereof is a supercooling liquid supply tube 5 for supplying the supercooling liquid 3 to the interior of the rotor container 2. The supercooling liquid supply tube 5 has a double-wall structure 6 constituted by two concentric tubes. The space defined between the two concentric tubes is evacuated for thermal insulation of the inside of the structure 6 from the outside. The supercooling liquid supply tube 5 also extends through and up to the vicinity of a closed outer end of the other hollow cylinder 4 and slightly spaced from the inner wall thereof. It is connected to a supercooling liquid storage tank not shown, and it is held stationary. The supercooling liquid 3 supplied through the supply tube 5 flows through an outlet and enters the rotor container 2.

If the supercooling liquid flowing into the rotor container 2 directly reaches the rotating inner portion thereof, it will encounter the rotating liquid therein, so that heat will be generated due to friction involved to result in increased evaporation of the supercooling liquid due to the generated heat.

In order to avoid or reduce the generation of heat due to friction, a liquid guide member 9 is provided. It is secured to the rotor container 2 such that it surrounds the outlet 8 of the supercooling liquid supply tube 5. It has a conical inner wall having a smallest diameter portion of a slightly greater diameter than the outlet 8. The supercooling liquid 3 coming out of the outlet 8 into the smallest diameter portion of the guide member 9 of a relatively small peripheral speed is guided along the inner guide wall of progressively greater diameters before it is eventually introduced into the interior of the rotor container 2.

The supercooling liquid 3 within the rotor container 2 will flow relative to the container 2 as it experiences both centrifugal force and gravitational force. If this flow is substantial, considerable heat will be again generated due to viscous friction involved, giving rise to the evaporation of the supercooling liquid 3.

In order to avoid or reduce this flow, a plurality of baffle plates 10 of an arcular cross sectional profile are radially arranged within the rotor container 2 and secured thereto. These baffle plates 10 extend substantially along the inner periphery of the supercooling liquid 3 centrifugally urged against the inner wall of the rotating rotor container 2.

The supercooling liquid 3 within the container 2 will also be evaporated due to the thermal loss in the field coil 1 and external thermal leak. The resultant gas is then collected in the center of the container 2. Each hollow cylinder 4 has a double-wall structure consisting of a small diameter tubular wall 4a and a large diameter tubular wall 4b, with these tubular walls defining a space providing for a passage, through which the collected evaporation gas is led out. Within the space defined by the two tubular walls there are disposed a plurality of thin annular heat exchanger walls 12 of a material of good thermal conductivity such as copper.

In the instant embodiment, the heat exchanger walls 12 consists of an alternate arrangement of small diameter heat exchanger walls 12a secured for good thermal conduction to the small diameter tubular wall 4a of the hollow cylinder 4 and slightly spaced from the large diameter tubular wall 4b thereof and large diameter heat exchanger walls 12b secured for good thermal conduction to the large diameter tubular wall 4b and slightly spaced from the small diameter tubular wall 4a. The inner end of each hollow cylinder 4 is provided with an inner closure member 4c having an inlet or inlets 11 to permit the collected evaporation gas of the supercooling medium to flow into the evaporation gas passage within the double-wall structure of the hollow cylinder 4, while the outer end of the hollow cylinder is provided with an outer closure member 4d having an outlet or outlets 13 through which the evaporation gas having passed thorough the passage is discharged. With the heat exchanger walls 12 arranged axially along the double-wall structure of the hollow cylinder 4, the evaporation gas is guided through the evaporation gas passage for a greater distance than the geometrical distance from the inlet or inlets 11 to the outlet or outlets 13 for efficient cooling of the heat exchanger walls 12.

The supercooling medium evaporation gas collected in the rotor container 2 and introduced into the double-wall structure of the hollow cylinder 4 cools the heat exchanger walls 12 arranged in the space defined by the double-wall structure successively from the side of the rotor container 2, so that a substantially uniform temperature gradient from the supercool temperature down to normal temperature may be established throughout the length of the hollow cylinder 4 from the inlet or inlets 11 toward the outlet or outlets 13. The evaporation gas having been elevated substantially up to the atmospheric temperature is discharged out of the hollow cylinder through the outlet or outlets 13.

A stationary gas recovery tube 14 is provided to surround the outlet or outlets 13. The gas-tight seal between the gas recovery tube and the associated hollow cylinder is achieved through a packing 15 or 16. Since the evaporation gas is elevated up to nearly the atmospheric temperature at the outlet or outlets 13, there is no possibility of causing damage to the packings 15 and 16. The hollow cylinders 4 are journalled in bearings 17.

In order to prevent external thermal flow into the inside of the rotor container 2, it is provided with a thermal insulation layer 18 consisting of an alternate arrangement of aluminum foil and glass cloth arranged in vacuum. The thermal insulation layer 18 is surrounded by a shield 19 of a good conductor such as copper for shielding alternating field components produced from the stator coil (not shown). The shield 19 is effective in preventing the evaporation of the supercooling liquid 3 that would otherwise result due to heat generated as a result of variations of the field flux linking with the field coil 1, causing large eddy current in the field coil 1, which is held at an extremely low temperature and is offering an extremely low resistance. Particularly, the provision of the shield 18 is effective where the field coil 1 is formed by a superconductive wire, because in such case field variations would otherwise have such adverse effect that the superconductive wire cannot be held in its superconductive state. In this case, the field set up by the field coil 1 will not be shielded by the shield 19.

Current may be led to the field coil 1 through slip rings 21 and 22 and lead not shown extending through the hollow cylinders 4, and a connector ring 23 may be used for coupling with external power source or load. These slip rings 21 and 22 and connection ring 23 may be disposed within the hollow cylinder apart from the supercooling liquid supply tube 5, which is advantageous in that the construction may be simplified.

Figure 2:
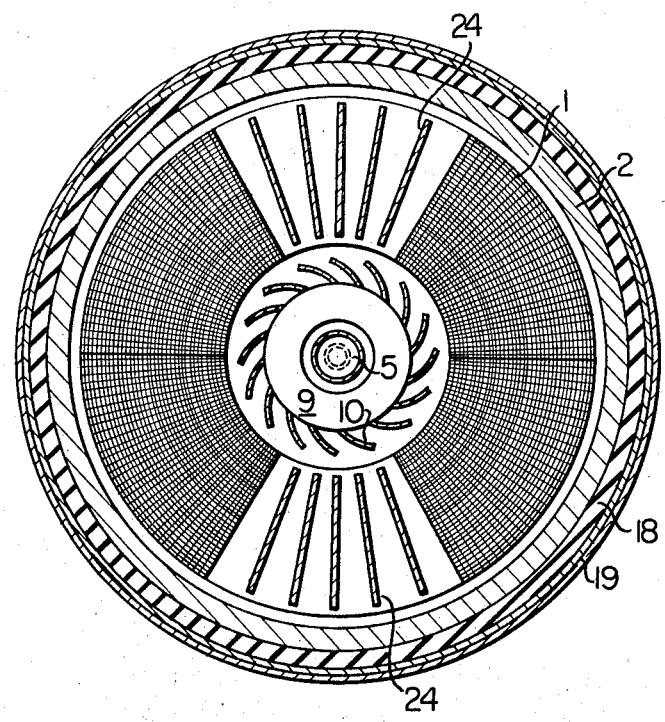
FIG. 2 is a sectional view taken along line II—II in FIG. 1.

FIG. 2 shows a sectional view taken along line II—II in FIG. 1. In the Figure, the rotor is rotated in the clockwise direction. The field coil 1 is wound into a saddle-shaped form, and its straight portion is shown. The baffles 10 are curved in the counterclockwise direction. Within a space not occupied by the field coil 1 but filled with the supercooling liquid 3 there are disposed a plurality of baffles 24 secured to the rotor container. This means effectively prevents heat generation due to friction involved in the otherwise possible flow of the supercooling liquid 3 relative to the rotor container 2, thus effectively preventing the resultant evaporation of the supercooling liquid.

Figure 3:
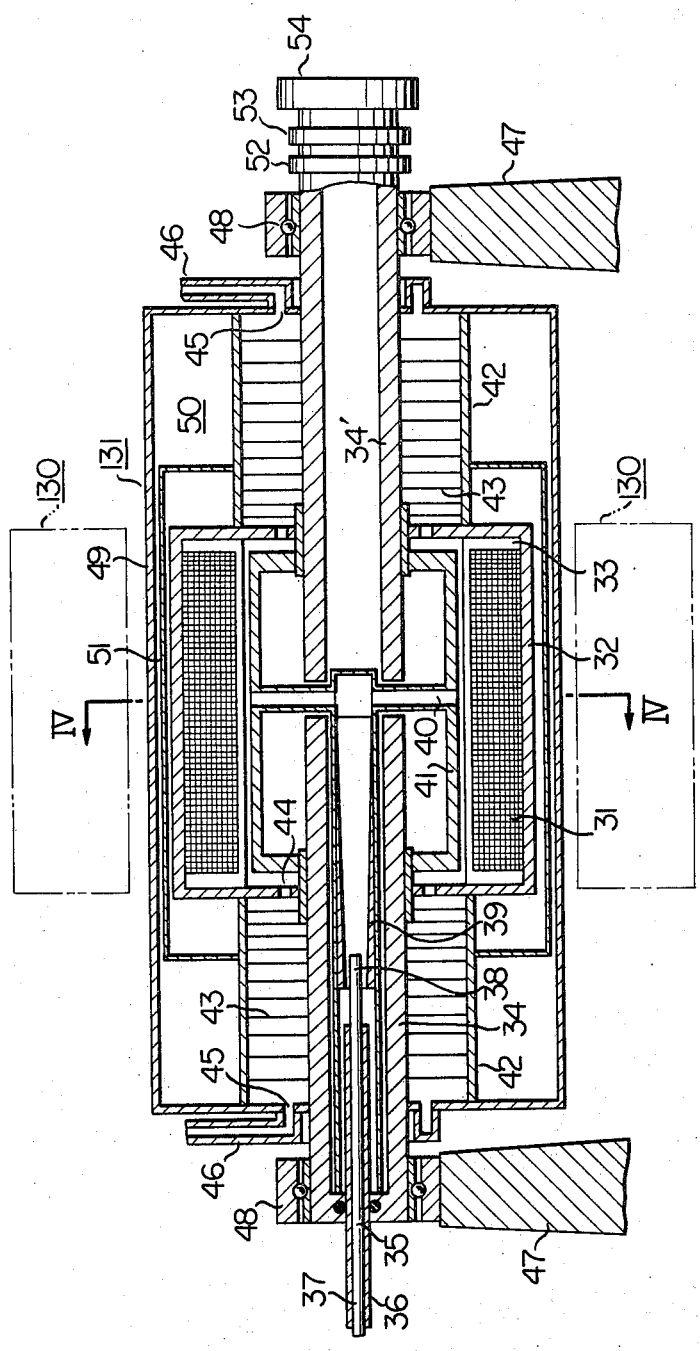
FIG. 3 is an axial sectional view of another embodiment of the supercooled rotor coil type electric machine according to the invention.

FIG. 3 shows another embodiment of the invention. A rotor 131 is disposed within a stator 130. A field coil 31 wound into a predetermined form arranged along the inner wall of a rotor container 32. The field coil 31 is formed by winding a superconductive wire or a wire of a good condcutor. The coil 31 is held immersed in a supercooling liquid 33 introduced into the rotor container 32. The rotor is supported by integral hollow cylinders 34 and 34' serving as rotor shaft and axially extending from its opposite ends. Extending centrally through the left hand hollow cylinder 34 and spaced from the inner wall thereof is a supercooling liquid supply tube 35 for supplying the supercooling liquid 33 to the interior of the rotor container 32. The supercooling liquid supply tube 35 has a double-wall structure 36 consisting of two concentric tubular walls. The space defined between these two concentric walls is evacuated for thermal insulation of the inside of the structure 36 from the outside. The supercooling liquid supply tube 35 is connected to a supercooling liquid storage tank not shown. Its tip is held stationary without being supported within the hollow cylinder 34 and forms an outlet 38. The hollow cylinder 34' also has a double-wall structure, whose inner space is evacuated. The supercooling liquid 33 supplied through the supply tube 35 flows through the outlet 38 thereof into the rotor container 32. At this time, the supercooling liquid coming out of the outlet 38 is guided through a guide member 39, which is disposed to surround the outlet 38 and has a conical inner wall having a smallest diameter portion of a slightly greater diameter than the outlet 38, and then through communication ducts 40 to enter the interior of the rotor container 32.

The supercooling liquid 33 introduced into the rotor container 32 is urged against the inner wall thereof due to the centrifugal force produced by the rotation of the container 32, so that in operation the field coil 31 can always be held immersed in the supercooling liquid 33.

Provided within and centrally of the rotor container 32 is a concentric partition wall structure 41. The inner space defined by the partition wall structure 41 is evacuated. By the outer periphery of the partition wall structure 41, the radial flow of the supercooling liquid 33 may be prevented.

The supercooling liquid 33 within the rotor container 32 undergoes evaporation due to the thermal loss in the field coil 31 and external thermal leak, and the resultant evaporation gas is collected in a central space within the rotor container 32. The collected evaporation gas of the supercooling medium is guided through a space defined by each of the hollow cylinders 34 and 34' and an outer cylindrical wall member 42 surrounding the associated hollow cylinder. Within the aforesaid space, through which the evaporation gas is guided to the outside for discharging, there are provided a plurality of annular heat exchanger walls 43 secured to the hollow cylinder 34 or 34', and they will be described in further detail later. The supercooling medium evaporation gas collected in the rotor container 32 is introduced through an evaporator gas inlet 44 formed in each end wall of the container 32 into the afore-said space, and as it is guided therethrough it cools the heat exchanger walls 43 successively arranged therein from the side of the rotor container 32, so that a substantially uniform temperature gradient from the supercool temperature down to normal temperature may be established throughout the length of the hollow cylinder 34 or 34'. The evaporation gas having elevated substantially up to the atmospheric temperature is discharged out of the afore-said space through an evaporation gas outlet 45. For the formation of the uniform temperature gradient, it is effective to arrange the heat exchanger walls 43 such that the distance between adjacent heat exchanger walls is smaller as we go toward the supercool temperature side and greater as we go toward the normal temperature side. The evaporation gas discharged from the afore-said space is recovered by a gas recovery tube provided to surround the evaporation gas outlet 45.

The hollow cylinders 34 and 34' are mounted in respective bearing means 48 secured to supports 47. For thermal insulation from the outside, the rotor container 32 and the outer cylindrical wall members 42 are enclosed within an outer covering 49, whose inner space 50 is evacuated. Within the evacuated space 50, a shield 51 made of a good conductor such as copper is provided and secured to an intermediate temperature portion of the outer cylindrical wall members 42 between the supercool temperature and normal temperature portions. The shield 51 is thus maintained at an intermediate temperature so that the heat radiation can be effectively prevented, while it can shield against external field variations. Slip rings for supplying power to the field coil 31 are provided within the hollow cylinder 34', and a connector ring 54 is provided at the end of the hollow cylinder 34'.

Figure 4:
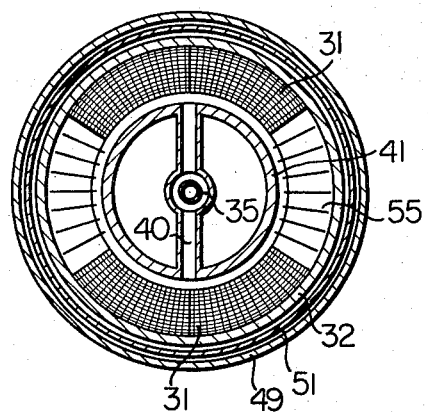
FIG. 4 is a sectional view taken along line IV—IV in FIG. 3.

FIG. 4 shows a sectional view taken along line IV—IV in FIG. 3. Baffles 55 are radially arranged in a space within the rotor container 32 not occupied by the field coil 31. They serve to prevent generation due to flow of the supercooling liquid within the container 32 to reduce evaporation thereof.

Figure 5:
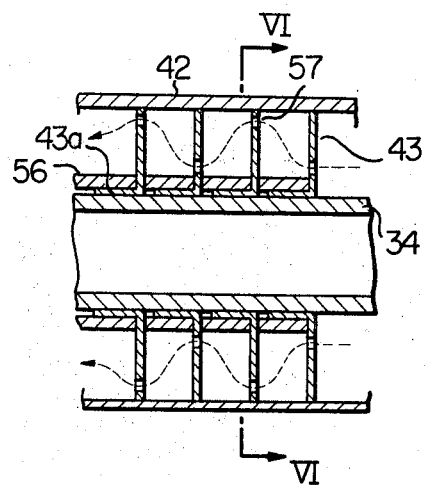
FIG. 5 is sectional view, to an enlarged scale, showing the hollow cylinder shown in FIG. 3.

FIG. 5 shows, to an enlarged scale, the hollow cylinder shown in FIG. 3. Each heat exchanger wall 43 has a cylindrical stem 43a, which is snugly fitted on the outer periphery of the hollow cylinder 34, so that good thermal conduction between each heat exchanger wall 43 and the hollow cylinder 34 may be obtained. The stem 43a of the heat exchanger wall 43 is fastened to the hollow cylinder 34 by a cylindrical spacer 56 made of a metal or synthetic resin having a greater coefficient of thermal expansion than the hollow cylinder 34. The spacer 56 has a greater axial dimension than the stem 43a of the heat exchanger wall 43 to hold adjacent heat exchanger walls 43 spaced apart from each other. In this respect, the spacer 56 is desirably made of a material of inferior thermal conductivity. By so doing, as its temperature is reduced the spacer excellently clamps the stem 43a of the heat exchanger wall 43 against the hollow cylinder 34.

Each heat exchanger wall 43 is formed with a plurality of small holes or apertures 57, through which the evaporation gas of the supercooling medium can flow.

Figure 6:
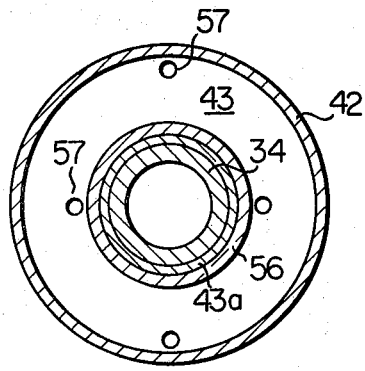
FIG. 6 is a sectional view taken along line VI—VI in FIG. 5.

FIG. 6 shows a section taken along line VI—VI in FIG. 5. It shows an example of the arrangement of the small holes 57 formed in a heat exchanger wall 43. With such arrangement of the small holes 57, a complicated passage for the evaporation gas may be formed for effective cooling of the heat exchanger walls 43.

In the preceding embodiment, the heat exchanger walls are provided along and in contact with the hollow cylinder and are successively cooled by the evaporating gas so as to establish a substantially uniform temperature gradient from the supercool temperature down to the normal temperature. To this end, the heat exchanger wall may have any desired configuration insofar as effective flow of the evaporation gas past the heat exchanger wall may be obtained. Also, the heat exchanger walls may be replaced with a sponge-like porous body, which has good thermal conductivity, and through which the evaporation gas can proceed in the axial direction.

Also, while the preceding embodiments have concerned with rotors having a field coil, this is by no means limitative, but the invention may also be carried out where the rotor is provided with an armature coil wound into a desired form.

We claim:

1. A supercooled rotor coil type electric machine comprising a stator maintained at an ambient temperature, a supercooled rotor including rotor coils, a cylindrical container enclosing said rotor coils and having end walls, said rotor coils being disposed radially apart from each other within said container, the major part of the outer surface of said container being coated with a thermal insulation layer, a closed hollow cylinder joined in axial alignment to at least one of the end walls of said container,, said one end wall of said container having at least one first aperture opening into said hollow cylinder and the opposite end wall of said hollow cylinder having at least one second aperture, means for feeding a supercooling liquid to said cylindrical container, and temperature graduating means contained in said hollow cylinder for providing an elongated path for gas passing through said hollow cylinder from said first aperture to said second aperture, whereby the gas evaporated from the supercooling liquid within said container and escaping therefrom serves to establish a substantially uniform temperature gradient over the length of said cylinder between the supercool temperature and the ambient temperature.

2. An electric machine according to claim 1, wherein said temperature graduating means comprises a plurality of partitions disposed perpendicular to the rotational axis of said rotor, each of said partitions having at least one aperture positioned in a manner to provide said elongated path for a gas passing through said cylinder.

3. An electric machine according to claim 2, wherein said hollow cylinder has an axial core which is defined by another coaxial cylinder or by the shaft of the rotor.

4. An electric machine according to claim 3, wherein every other one of said partitions is attached to said core of said hollow cylinder while the remaining partitions are attached to the peripheral wall of said cylinder.

5. An electric machine according to claim 3, wherein a collar is provided around said core of said hollow cylinder at each of the spaces between adjacent partitions to thereby secure said partitions in position.

6. An electric machine according to claim 5, wherein said collar is made of a material having a thermal contraction coefficient greater than that of the material of said core of said cylinder.

7. An electric machine according to claim 1, wherein said means for feeding the rotor with the supercooling liquid comprises stationary tube means provided in alignment with the rotational axis of said rotor and extending into the interior of said container.

8. An electric machine according to claim 1, wherein said container is provided with a liquid guide positioned within said container, said guide having a conical mouth coaxial with said rotor and opening to said container, the top portion of the conical mouth communicating with said supercool liquid feeding means to introduce the supercool liquid.

9. An electric machine according to claim 1, wherein a plurality of baffle plates are disposed within said container to reduce possible flow of the supercool liquid relative to said container.

10. An electric machine according to claim 1, wherein bearing means is provided at the external end portion of said hollow cylinder for supporting said rotor by said hollow cylinder.

11. An electric machine according to claim 9, wherein said baffle plates are disposed at an equal angular pitch around the shaft of the rotor in the space between said shaft and said rotor coils, said baffle plates having a curved profile.

12. An electric machine according to claim 9, wherein said baffle plates are radially disposed in the lateral spaces between said rotor coils with the plane of said plate being parallel to the rotational axis of said rotor.

13. A supercooled rotor coil type electric machine comprising a stator having a stator coil disposed in a normal temperature zone, a rotor container provided with thermal insulation means thermally insulating the inside of said rotor container from the outside, a rotor coil wound into a predetermined form and arranged along the inner wall of said rotor container, a hollow cylinder supporting one end of said rotor container and journalled in bearing means, a supercooling liquid supply means for supplying a supercooling liquid to the interior of said rotor container, a temperature gradient forming means provided integral with said hollow cylinders and having an evaporation gas inlet and an evaporation gas outlet in connection with said hollow cylinder for forming a substantially uniform temperature gradient over the length of said hollow cylinder from a supercool temperature at the end of said hollow cylinder adjacent said rotor container down to normal temperature at the opposite end of said hollow cylinder, evaporation gas resulting from the evaporation of the supercooling liquid introduced into said rotor container being introduced through each said inlet into said temperature gradient forming means and guided therethrough along said hollow cylinder, said temperature gradient forming means being provided with heat exchanger means secured for good thermal conduction to said hollow cylinder such that the evaporation gas flows through said temperature gradient forming means for a distance greater than the geometrical distance between the evaporation gas inlet and evaporation gas outlet provided in connection with said hollow cylinder, wherein said temperature gradient forming means is provided with a plurality of heat exchanger walls made of a material having good thermal conductivity, said heat exchanger walls being secured for good thermal conduction to said hollow cylinder and suitably spaced one from another along said hollow cylinder such that a gap is defined between each said heat exchanger wall and the associated hollow cylinder to permit flow of the evaporation gas in the axial direction through each said gap, said heat exchanger walls defining an evaporation gas passage of a greater length than the geometrical distance between the evaporation gas inlet and evaporation gas outlet provided in connection with said hollow cylinder.

14. A supercooled rotor coil type electric machine comprising a stator having a stator coil disposed in a normal temperature zone, a rotor container provided with thermal insulation means thermally insulating the inside of said rotor container from the outside, a rotor coil wound into a predetermined form and arranged along the inner wall of said rotor container, a hollow cylinder supporting one end of said rotor container and journalled in bearing means, a supercooling liquid supply means for supplying a supercooling liquid to the interior of said rotor container, a temperature gradient forming means provided integral with said hollow cylinders and having an evaporation gas inlet and an evaporation gas outlet in connection with said hollow cylinder for forming a substantially uniform temperature gradient over the length of said hollow cylinder from a supercool temperature at the end of said hollow cylinder adjacent said rotor container down to normal temperature at the opposite end of said hollow cylinder, evaporation gas resulting from the evaporation of the supercooling liquid introduced into said rotor container being introduced through each said inlet into said temperature gradient forming means and guided therethrough along said hollow cylinder, said temperature gradient forming means being provided with heat exchanger means secured for good thermal conduction to said hollow cylinder such that the evaporation gas flows through said temperature gradient forming means for a distance greater than the geometrical distance between the evaporation gas inlet and evaporation gas outlet provided in connection with said hollow cylinder, wherein said temperature gradient forming means is provided with a plurality of heat exchanger walls made of a material having good thermal conductivity, said heat exchanger walls being secured for good thermal conduction to said hollow cylinder and suitably spaced one from another along said hollow cylinder, said heat exchanger walls each being formed with at least one hole or aperture to permit flow of the evaporation gas in the axial direction, thereby defining an evaporation gas passage of a greater length than the geometrical distance between the evaporation gas inlet and evaporation gas outlet provided in connection with said hollow cylinder.

15. A supercooled rotor coil type electric machine comprising a stator having a stator coil disposed in a normal temperature zone, a rotor container provided with thermal insulation means thermally insulating the inside of said rotor container from the outside, a rotor coil wound into a predetermined form and arranged along the inner wall of said rotor container, a hollow cylinder supporting one end of said rotor container and journalled in bearing means, a supercooling liquid supply means for supplying a supercooling liquid to the interior of said rotor container, a temperature gradient forming means provided integral with said hollow cylinders and having an evaporation gas inlet and an evaporation gas outlet in connection with said hollow cylinder for forming a substantially uniform temperature gradient over the length of said hollow cylinder from a supercool temperature at the end of said hollow cylinder adjacent said rotor container down to normal temperature at the opposite end of said hollow cylinder, evaporation gas resulting from the evaporation of the supercooling liquid introduced into said rotor container being introduced through each said inlet into said temperature gradient forming means and guided therethrough along said hollow cylinder, said temperature gradient forming means being provided with heat exchanger means secured for good thermal conduction to said hollow cylinder such that the evaporation gas flows through said temperature gradient forming means for a distance greater than the geometrical distance between the evaporation gas inlet and evaporation gas outlet provided in connection with said hollow cylinder, wherein said temperature gradient forming means is provided with a plurality of heat exchanger walls made of a material having good thermal conductivity and each having a cylindrical stem fitted for good thermal conduction on the associated hollow cylinder, said heat exchanger walls being secured to said hollow cylinder by cylindrical spacer means determining the axial spacing between adjacent heat exchangers and made of a materal having a greater coefficient of thermal contraction than said hollow cylinder, said heat exchanger walls defining an evaporation gas passage of a greater length than the geometrical distance between the evaporation gas inlet and evaporation gas outlet in connection with said hollow cylinder.

16. A supercooled rotor coil type electric machine comprising a stator having a stator coil disposed in a normal temperature zone, a rotor container provided with thermal insulation means thermally insulating the inside of said rotor container from the outside, a rotor coil wound into a predetermined form and arranged along the inner wall of said rotor container, a hollow cylinder supporting one end of said rotor container and journalled in bearing means, a supercooling liquid supply means for supplying a supercooling liquid to the interior of said rotor container, a temperature gradient forming means provided integral with said hollow cylinders and having an evaporation gas inlet and an evaporation gas outlet in connection with said hollow cylinder for forming a substantially uniform temperature gradient over the length of said hollow cylinder from a supercool temperature at the end of said hollow cylinder adjacent said rotor container down to normal temperature at the opposite end of said hollow cylinder, evaporation gas resulting from the evaporation of the supercooling liquid introduced into said rotor container being introduced through each said inlet into said temperature gradient forming means and guided therethrough along said hollow cylinder, said temperature gradient forming means being provided with heat exchanger means secured for good thermal conduction to said hollow cylinder such that the evaporation gas flows through said temperature gradient forming means for a distance greater than the geometrical distance between the evaporation gas inlet and evaporation gas outlet provided in connection with said hollow cylinder, wherein said heat exchanger means is constituted by a sponge-like porous body of a material having good thermal conductivity secured for good thermal conduction to said hollow cylinder, the evaporation gas being permitted to proceed through each said porous body in the axial direction.

17. A supercooled rotor coil type electric machine comprising a stator having a stator coil disposed in a normal temperature zone, a rotor container provided with thermal insulation means thermally insulating the inside of said rotor container from the outside, a rotor coil wound into a predetermined form and arranged along the inner wall of said rotor container, a hollow cylinder supporting one end of said rotor container and journalled in bearing means, a supercooling liquid supply means for supplying a supercooling liquid to the interior of said rotor container, a temperature gradient forming means provided integral with said hollow cylinders and having an evaporation gas inlet and an evaporation gas outlet in connection with said hollow cylinder for forming a substantially uniform temperature gradient over the length of said hollow cylinder from a supercool temperature at the end of said hollow cylinder adjacent said rotor container down to normal temperature at the opposite end of said hollow cylinder, evaporation gas resulting from the evaporation of the supercooling liquid introduced into said rotor container being introduced through each said inlet into said temperature gradient forming means and guided therethrough along said hollow cylinder, said temperature gradient forming means being provided with heat exchanger means secured for good thermal conduction to said hollow cylinder such that the evaporation gas flows through said temperature gradient forming means for a distance greater than the geometrical distance between the evaporation gas inlet and evaporation gas outlet provided in connection with said hollow cylinder, wherein a further hollow cylinder is provided supporting the other end of said rotor container, and wherein said supercooling liquid supply means penetrates one of said hollow cylinders and having a tip extending in the other hollow cylinder, said supercooling liquid supply means being provided in a portion thereof extending in said rotor container with a supercooling liquid outlet, a connector ring for electric connection of said machine to an external apparatus being provided in one of said hollow cylinders not penetrated by said supercooling liquid supply means.

18. A supercooled rotor coil type electric machine comprising a stator having a stator coil disposed in a normal temperature zone, a rotor container provided with thermal insulation means thermally insulating the inside of said container from the outside, a rotor coil wound into a predetermined form and arranged along the inner wall of said rotor container, a hollow cylinder supporting one end of said rotor container and journalled in bearing means, a supercooling liquid supply means for supplying a supercooling liquid to the interior of said rotor container, a temperature gradient forming means provided integral with said hollow cylinder for forming a substantially uniform temperature gradient over the length of said hollow cylinder from a supercool temperature at the end of said hollow cylinder adjacent said rotor container down to normal temperature at the opposite end of said hollow cylinder, evaporation gas resulting from the evaporation of the supercooling liquid introduced into said rotor container being guided through said temperature gradient forming means along said hollow cylinder, means to recover the evaporation gas discharged from said temperature gradient forming means, a plurality of baffle plates of a curved cross-sectional profile being disposed within said rotor container along a cylindrical liquid surface of the supercooling liquid that results in operation when the rotor container is rotated.

19. A supercooled rotor coil type electric machine comprising a stator having a stator coil disposed in a normal temperature zone, a rotor container provided with thermal insulation means thermally insulating the inside of said container from the outside, a rotor coil wound into a predetermined form and arranged along the inner wall of said rotor container, a hollow cylinder supporting one end of said rotor container and journalled in bearing means, a supercooling liquid supply means for supplying a supercooling liquid to the interior of said rotor container, a temperature gradient forming means provided integral with said hollow cylinder for forming a substantially uniform temperature gradient over the length of said hollow cylinder from a supercool temperature at the end of said hollow cylinder adjacent said rotor container down to normal temperature at the opposite end of said hollow cylinder, evaporation gas resulting from the evaporation of the supercooling liquid introduced into said rotor container being guided through said temperature gradient forming means along said hollow cylinder, means to recover the evaporation gas discharged from said temperature gradient forming means, said rotor container being provided with a plurality of baffle plates radially arranged in a space of said container filled with the supercooling liquid but not occupied by said rotor coil.

* * * * *